United States Patent Office
3,452,074
Patented June 24, 1969

3,452,074
HALOGEN-CONTAINING ORGANIC CARBONATES
William E. Weesner, Kettering, Ohio, assignor to Monsanto Research Corporation, St. Louis, Mo., a corporation of Delaware
No Drawing. Filed May 23, 1966, Ser. No. 551,887
Int. Cl. C07c 69/00
U.S. Cl. 260—463                    2 Claims

ABSTRACT OF THE DISCLOSURE

A fluorine-containing organic carbonate of the formula $$\text{R'O}-\overset{\overset{\displaystyle O}{\|}}{C}-O-R-OY$$

wherein R is a fluorine-substituted alkylene radical of from 2 to 10 carbon atoms which is linked to the remainder of the molecule through a fluorine-free carbon atom, R' is alkyl and Y is hydrogen or alkyl.

---

This invention relates to halogen-containing organic compounds and more particularly provides a new and valuable class of halogen-containing organic carbonates.

According to the invention, there are provided certain holagen-containing organic carbonates which may be represented by the following formula:

$$\text{R'O}-\overset{\overset{\displaystyle O}{\|}}{C}-O-R-OY$$

wherein R is a hologen-substituted alkylene radical of from 2 to 10 carbon atoms, in which the atomic weight of the halogen is less than 40 and which is linked to the remainder of the molecule through a halogen-free carbon atom; R' is selected from the class consisting of alkyl and haloalkyl radicals having from 1 to 12 carbon atoms, in which the halogen has an atomic weight of less than 40; and Y is selected from the class consisting of hydrogen, R' and $$-\overset{\overset{\displaystyle O}{\|}}{C}-OR'$$

wherein R' is as defined above.

Although R' may have 1 to 12 carbon atoms, the preferred range is from 1 to 6 carbon atoms.

According to the invention, the presently provided halogen-containing carbonates are prepared by reaction of a chloroformate and a halogen-substituted hydroxy aliphatic compound substantially according to the following scheme:

$$\text{R'O}\overset{\overset{\displaystyle O}{\|}}{C}\text{Cl} + \text{HO}-\text{R}-\text{OY} \longrightarrow \text{R'O}\overset{\overset{\displaystyle O}{\|}}{C}-O-R-OY + \text{HCl}$$

wherein R, R' and Y are as defined above.

The nature of the carbonate which is obtained depends upon the individual hydroxy compound which is employed. Also, when the hydroxy compound is glycol, the nature of the carbonate depends upon whether sufficient chloroformate is used for esterifying both of the hydroxy groups. Therefore, the presently provided compounds include:

(1) Monocarbonates of the formula $$\text{R'}-\text{O}-\overset{\overset{\displaystyle O}{\|}}{C}-O-R-OH$$

which are obtained by reaction of an alkylene glycol with one mole of the chloroformate.

(2) Monocarbonates of the formula $$\text{R'}-\text{O}-\overset{\overset{\displaystyle O}{\|}}{C}-O-R-OR'$$

which are obtained by either of the following two procedures:
(a) Reaction of the mono-alkyl ether of an alkylene glycol with one mole of the chloroformate.
(b) Reaction of a halogen-substituted hemiacetal with one mole of a chloroformate.

(3) Dicarbonates of the formula $$\text{R'}-\text{O}-\overset{\overset{\displaystyle O}{\|}}{C}-\text{O}-\text{R}-\text{O}-\overset{\overset{\displaystyle O}{\|}}{C}-\text{OR'}$$

which are obtained by either of the following two procedures:
(a) Reaction of an alkylene glycol with two moles of the chloroformate.
(b) Reaction of the monocarbonate shown in (1) above wih one mole of the chloroformate. This method thus involves use of the hitherto unknown $$\text{R'}-\text{O}-\text{C(O)}-\text{R}-\text{OH}$$

compounds as starting materials.

Presently useful chloroformates are: methyl, chloromethyl, dichloromethyl, trichloromethyl, ethyl, 2-fluoroethyl, 2-chloroethyl, 1-chloroethyl, 2,2,2-trichloroethyl, 1-propyl, 3 - chloro - 1 - propyl, 2,2,3,3,4,4,5,5,6,6,7,7,8,8,8-pentadecafluoro-1-octyl 10-chlorodecyl, 11-chloro-2,2,3,3, 4,4,5,5,6,6,7,7,8,8,9,9,10,10,11,11 - eicosafluoro - 1 - undecyl, and 12,12-dichloro-1-dodecyl chloroformate.

Presently useful halogen-substituted hydroxy aliphatic compounds include glycols, hemiacetals, hydroxy ethers, and the mono(carbonates) of the present invention represented by the formula $$\text{R'O}-\overset{\overset{\displaystyle O}{\|}}{C}-O-R-OH$$

As halogen-substituted glycols, there may be used, e.g.:

2,2,3,3,-tetrachloro-1,4-butanediol
2,2,3,3,4,4-hexafluoro-1,5-pentanediol
2,3,4,5-tetrachloro-1,6-hexanediol
2,2,3,3,4,4,5,5-octafluoro-1,6-hexanediol
2,3,4,5,6,7,8-heptachloro-1,9-nonanediol
2,2,3,3,4,4,5,5,6,6,7,7,8,8,9,9 - hexadecafluoro - 1,10-decanediol As halogen-substituted hemiacetals, there may be used, e.g.:

2,2,2-trifluoro-1-methoxyethanol
1-ethoxy-2,2,2-trifluoroethanol
2,2,2-trifluoro-1-propoxyethanol
1-butoxy-2,2,2-trifluoroethanol
2,2,2-trifluoro-1-octyloxyethanol
1-dodecycloxy-2,2,2-trifluoroethanol
2,2,2-trichloro-1-ethoxyethanol
2,2,2-trichloro-1-propoxyethanol
1-butoxy-2,2,2-trichloroethanol
1-ethoxy-2,2,3,3,3-pentafluoro-1-hexyloxypropanol
2,2,3,3,4,4,4-heptafluoro-1-methoxybutanol
1-dodecycloxy-2,2,3,3,4,4,4-heptafluorobutanol
2,2,3,3,4,4,5,5,6,6,7,7,8,8,8 - pentadecafluoro - 1 - pentyloxyoctanol As halogenated hydroxy ethers, there may be used, e.g.:

5-ethoxy-2,2,3,3,4,4-hexafluoropentanol
2,2,3,3,4,4,5,5-octafluoro-6-methoxyhexanol Monocarbonates represented by the formula $$\text{R'O}-\overset{\overset{\displaystyle O}{\|}}{C}-O-R-OH$$

which are useful as starting materials for the bis(carbonates) are provided by the present invention by the reaction of a halogen-substituted glycol with one mole of the chloroformate. Presently useful hydroxy-containing mono (carbonates) are, e.g.:

2,2,3,3 - tetrachloro - 4 - hydroxybutyl methyl carbonate
dichloromethyl 2,2,3,3,4,4 - hexafluoro - 5 - hydroxypentyl carbonate
ethyl-2,2,3,3,4,4-hexafluoro - 5 - hydroxypentyl carbonate
2,2,2-trichloroethyl 2,2,3,3,4,4,5,5-octafluoro - 6 - hydroxyhexyl carbonate
11 - 2,2,3,3,4,4,5,5,6,6,7,7,8,8,9,9,10,10,11,11, - eicosafluoro - 1 - undecyl 2,2,3,3,4,4,5,5,6,6,7,7,8,8,9,9, - hexadecafluoro-10-hydroxydecyl carbonate The presently provided halogen-containing carbonates, including the hydroxy - containing mono(carbonates) above, all of which may be represented by the formula

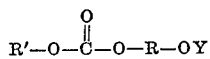

are illustrated by typical examples listed in the following table.

$$R'-O-\overset{O}{\underset{\|}{C}}-O-R-OY$$

| R' | R | Y |
|---|---|---|
| Methyl | $-CH_2(CCl_2)_2CH_2-$ | H |
| Dichloromethyl | $-CH_2(CF_2)_3CH_2-$ | H |
| Ethyl | $-CH_2(CF_2)_3CH_2-$ | H |
| 2,2,2-trichloroethyl | $-CH_2(CF_2)_4CH_2-$ | H |
| Butyl | $-CH_2(CF_2)_2CH_2-$ | H |
| Octyl | $-C(CH_3)_2(CF_2)_3C(CH_3)_2-$ | H |
| Dodecyl | $-CH(CF_3)CH_2-$ | H |
| $ClF_2C(CF_2)_9CH_2-$ | $-CH_2(CF_2)_3CH_2-$ | H |
| Ethyl | $-CH_2(CF_2)_3CH_2-$ | Octyl |
| 2,2,2-trichloroethyl | $-CH_2(CF_2)_3CH_2-$ | Ethyl |
| Octyl | $-CH_2(CF_2)_4CH_2-$ | Methyl |
| 12,12-dichloro-1-dodecyl | $-CH(CF_3)-$ | Methyl |
| Ethyl | $-CH(CF_3)-$ | Ethyl |
| 1-chloroethyl | $-CH(CCl_3)-$ | Dodecyl |
| 2-fluoroethyl | $-CH(CCl_3)-$ | Butyl |
| Methyl | $-CH(CF_2CF_3)-$ | Hexyl |
| Dodecyl | $-CH_2(CF_2)_8CH_2-$ | Pentyl |
| Methyl | $-CH_2(CCl_2)_2CH_2-$ | $-\overset{O}{\underset{\|}{C}}-OCH_3$ |
| Dichloromethyl | $-CH_2(CF_2)_3CH_2-$ | $-\overset{O}{\underset{\|}{C}}-OCHCl_2$ |
| Ethyl | $-CH_2(CF_2)_3CH_2-$ | $-\overset{O}{\underset{\|}{C}}-OC_2H_5$ |
| Do | $-CH_2(CF_2)_4CH_2-$ | $-\overset{O}{\underset{\|}{C}}-OCH_3$ |
| Octyl | $-CH(CF_3)CH_2-$ | $-\overset{O}{\underset{\|}{C}}-OC_8H_{17}$ |
| 10-chlorodecyl | $-CH_2(CF_2)_8CH_2-$ | $-\overset{O}{\underset{\|}{C}}-OCH_3$ |

Reaction of a chloroformate with a halogen-substituted hydroxy aliphatic compound to give the presently provided halogen-containing organic carbonates is conducted by simply mixing the two reactants in a suitable solvent until formation of said carbonate is completed. As solvent there may be used benzene, toluene, xylene, etc.

The formation of mono(carbonates) takes place by reaction of one mole of the chloroformate with one mole of a glycol. A deficiency of the chloroformate may be employed, however, without deleterious results; the excess glycol is readily separated from the product at the conclusion of the reaction. The formation of bis(carbonates) takes place by reaction of two moles of the chloroformate with one mole of the glycol. An excess of the chloroformate may be employed if desired. When a ratio of between 1:1 and 2:1 moles of chloroformate to glycol is employed, the product consists of a mixture of the mono- and bis(carbonates) which may be separated by any of several methods, including fractional distillation, solvent extraction, chromatography, etc.

Generally the reaction is exothermic; hence, heating is usually not required and the reaction may be conducted by operating at ambient temperatures, or even with cooling. However, to shorten the reaction time and to achieve maximum production for a given size reaction vessel, it may be desirable to supply heat. Temperatures of from, say, 30° C. to 85° C. are thus useful.

Catalysts may be employed to hasten the reaction between the chloroformate and the hydroxy compound. To insure high yields of the products, hydrogen chloride acceptors are advantageously employed, which may be alkali metals or their hydrides or hydroxides, or preferably tertiary amines, e.g., triethylamine or pyridine.

The halogen-containing organic carbonates are generally liquids which are distillable and which are usually soluble in organic solvents such as benzene, acetone, etc. The present carbonates are useful as polymer intermediates, fluids, lubricants and biological toxicants.

The invention is further illustrated by, but not limited to, the following examples.

Example 1

This example illustrates the preparation of ethyl 2,2,3,3,4,4-hexafluoro-5-hydroxypentyl carbonate.

To a slurry of 64.7 g. (0.305 mole) of recrystallized 2,2,3,3,4,4-hexafluoro-1,5-pentanediol and 29.2 g. (0.29 mole) of triethylamine in 400 ml. of benzene was added 30.3 g. (0.28 mole) of ethyl chloroformate in 1 hour at 24–31° C. The slurry was stirred at room temperature for 1.5 hours, at reflux for 2 hours, and then cooled and filtered. The filtrate was concentrated by evaporation of the solvent and the residue was distilled to give a mixture consisting essentially of 65% of the desired ethyl 2,2,3,3,4,4 - hexafluoro-5-hydroxypentyl carbonate and 35% of 2,2,3,3,4,4-hexafluoropentamethylene bis(ethyl carbonate). It analyzed as follows:

Calcd. for 65% $C_8H_{10}F_6O_4$, 35% $C_{11}H_{14}F_6O_6$: C, 34.95%; H, 3.74%; F, 37.22%. Found: C, 35.19%; H, 3.92%; F, 37.28%.

Without recovering the ethyl hexafluoro-5-hydroxypentyl carbonate, the mixture was directly used as a plasticizer for polyvinyl chloride by milling it with the polymer in a quantity corresponding to 40% by weight of the total composition with the balance being the polymer. The plasticized polymer possessed good properties at very low and very high temperatures.

Example 2

This example illustrates the preparation of 2,2,3,3,4,4-hexafluoropentamethylene bis(ethyl carbonate).

To a solution of 42.4 g. (0.2 mole) of recrystallized 2,2,3,3,4,4-hexafluoropentanediol and 45.5 g. (0.45 mole) of triethylamine in 300 ml. of benzene was added 48.8 g. (0.45 mole) of redistilled ethyl chloroformate at 27–39° C. in 24 minutes. An ice-water bath was used to control the temperature. The slurry was stirred 4 hours at room temperature, 3 hours at reflux, then cooled, and filtered. The filtrate was concentrated by evaporation of the solvent and the residue was distilled to give 65.6 g. (92.3% yield) of 2,2,3,3,4,4-hexafluoropentamethylene bis(ethyl carbonate), B.P. 94–98° C./0.2 mm., $n_D^{25}$ 1.3805. It analyzed as follows:

Calcd. for $C_{11}H_{14}F_6O_6$: C, 37.05%; H, 3.96%; F, 32.00%. Found: C, 37.27%; H, 4.08%; F, 31.86%.

The product is useful as a brake fluid of low flammability.

Example 3

This example illustrates the preparation of ethyl 1-ethoxy-2,2,2-trifluoroethyl carbonate.

To a solution of 30 g. (0.21 mole) of 1-ethoxy-2,2,2-trifluoroethanol and 25.3 g. (0.25 mole) of triethylamine in 100 ml. of benzene was added 27.7 g. (0.25 mole) of ethyl chloroformate over a period of 1.5 hours at 28–35° C. The slurry was stirred 2 hours at room temperature and filtered to remove the coformed triethylamine hydrochloride. The filtrate was fractionally distilled to yield the desired ethyl 1-ethoxy-2,2,2-trifluoroethyl carbonate, B.P. 67° C./24 mm., $n_D^{25}=1.3580$, in 75% yield. It analyzed as follows:

Calcd. for $C_7H_{11}F_3O_4$: C, 38.89%; H, 5.13%; F, 26.36%. Found: C, 39.59%; H, 5.30%; F. 24.73%.

The product is useful as a stabilizer for lubricating greases when incorporated in a quantity of 5% of the composition.

It is to be understood that although the invention has been described with specific reference to particular embodiments thereof, it is not to be so limited since changes and alterations therein may be made which are within the full intended scope of this invention.

What is claimed is:

1. A fluorine-containing organic carbonate of the formula

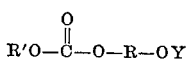

wherein R is a fluorine-substituted alkylene radical of from 2 to 10 carbon atoms which is linked to the remainder of the molecule through a fluorine-free carbon atom; R' is alkyl of from 1 to 12 carbon atoms; and Y is hydrogen.

2. The compound described in claim 1 further limited in that R is 2,2,3,3,4,4-hexafluoropentamethylene and R' is ethyl.

References Cited

UNITED STATES PATENTS

| 2,510,600 | 6/1950 | Pace | 260—77.5 |
| 2,711,997 | 6/1955 | Trieschmann et al. | 260—29.1 |
| 3,120,553 | 2/1964 | Stenseth et al. | 260—463 |

FOREIGN PATENTS

| 1,214,664 | 4/1966 | Germany. |

OTHER REFERENCES

Newallis et al., Fluoro Ketones III: Preparation and Thermal Decomposition of Fluoroacetone Hemiketal Esters, J. Organic Chem., 30 (ii), pp. 3834–7, November 1965.

BERNARD HELFIN, *Primary Examiner.*

L. J. DE CRESCENTE, *Assistant Examiner.*

U.S. Cl. X.R.

252—54.6, 78, 380